April 5, 1960     H. FRASER ET AL     2,931,606
AUTOMATICALLY RELEASING CABLE SUSPENSION CLAMP
Filed June 13, 1958     3 Sheets-Sheet 1
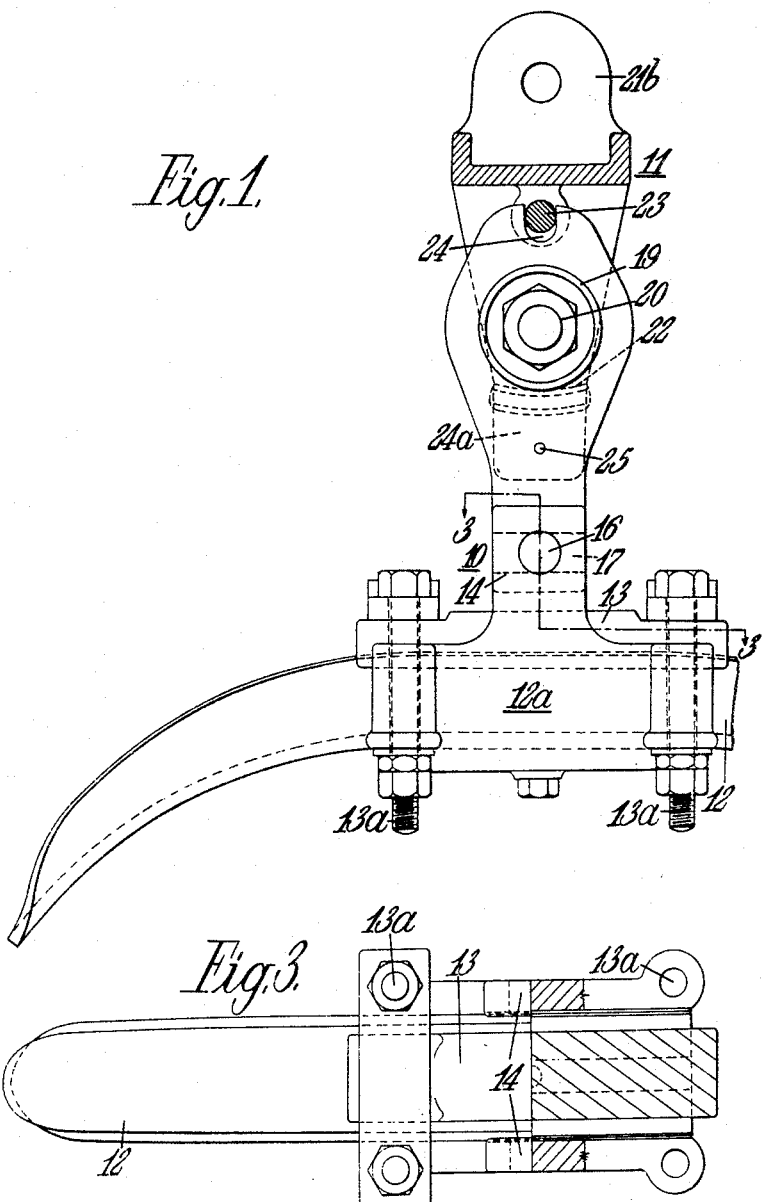

April 5, 1960     H. FRASER ET AL     2,931,606
AUTOMATICALLY RELEASING CABLE SUSPENSION CLAMP
Filed June 13, 1958     3 Sheets-Sheet 2
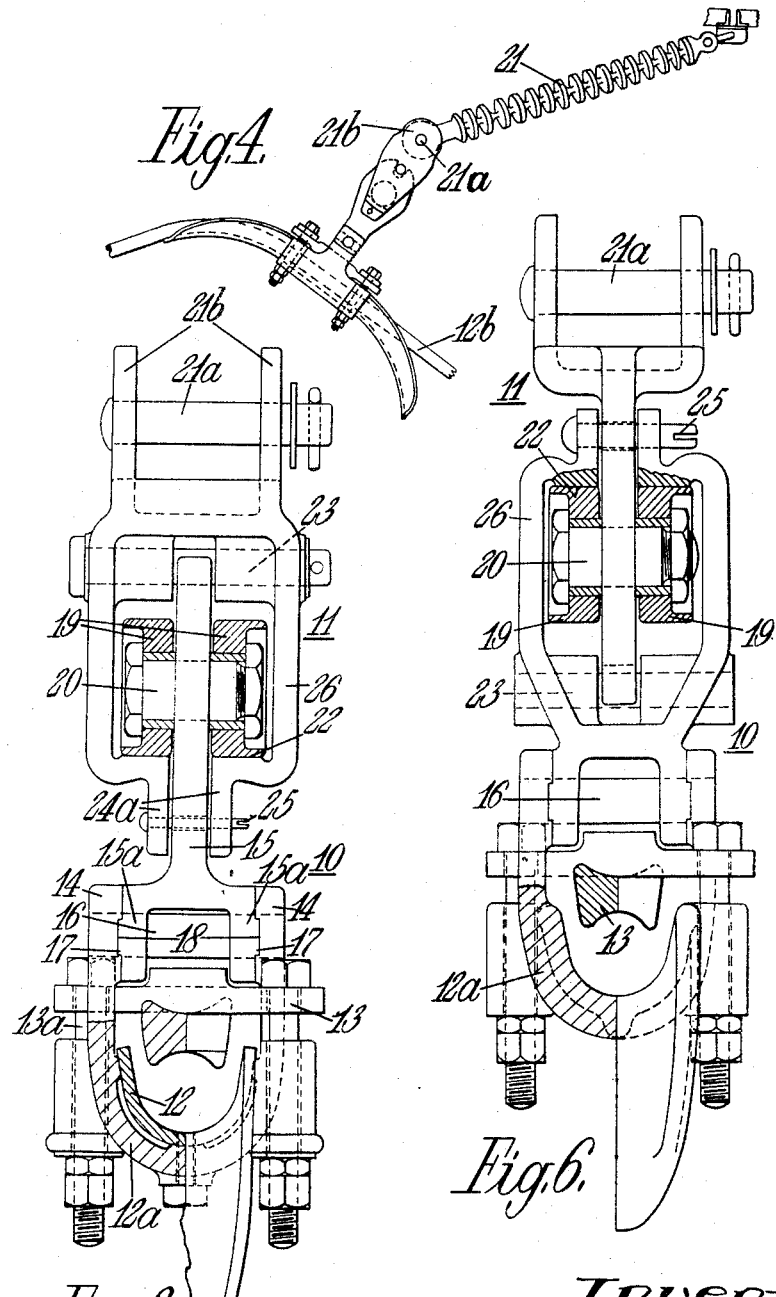
Inventors
H. Fraser
W. G. Cantlay
By Hascock Downing & Leibold
Attys.

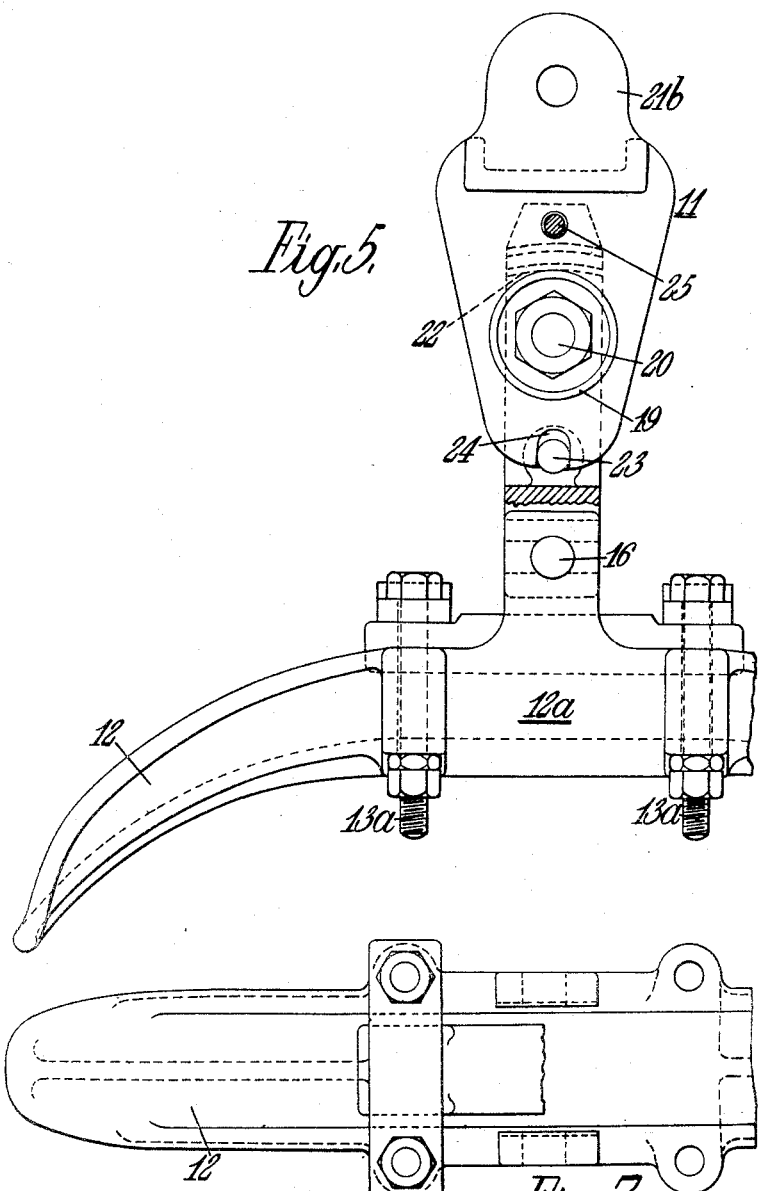

United States Patent Office 2,931,606
Patented Apr. 5, 1960

2,931,606
AUTOMATICALLY RELEASING CABLE SUSPENSION CLAMP

Hugh Fraser and William Gordon Cantlay, Burnside by Rutherglen, Scotland

Application June 13, 1958, Serial No. 741,807

4 Claims. (Cl. 248—64)

This invention has reference to means for connecting overhead high tension electrical cables to the insulators of overhead transmission towers.

In the suspension means at present in use for connecting high tension electrical cables to the insulators of overhead transmission towers serious damage is liable to occur in the event of a cable breaking between two transmission towers. The force suddenly applied by the cable on the other side of the towers, i.e. the unbroken cable, is apt to damage the insulator and to set up severe stresses on the tower structure.

The present invention has for its object to provide means whereby in the event of breakage in a high tension electrical cable extending between towers damage to the suspension means, insulator or tower from this source will not arise.

According to the present invention a suspension unit for suspending overhead high tension cables comprises an upper part adapted for pivotal connection to an insulator and a lower part having clamping means by which a cable can be secured thereto, the two parts having co-operating means whereby the lower part is supported by the upper part when said parts are in their assembled positions and locking means whereby the two parts are retained normally in their assembled positions, said locking means being such that it yields when the unit pivots about its pivotal support to a predetermined extent, as will occur when the cable on one side of the clamping device breaks, and thus permits the lower part to move relative to the upper part and drop to the ground.

The invention further consists in a suspension unit as set forth in the preceding paragraph wherein that part thereof to which the cable is clamped is provided with a roller, or rollers, which is, or are, supported by a track or tracks carried by the other part of the suspension unit, the constructions being such that when the locking means yield the latter part moves to such extent that the track, or tracks, clear, or clears, the roller, or rollers, the part with the clamping means is permitted to fall.

In a modification that part of the suspension unit to which the cable is secured is provided with a track, or tracks, which bears, or bear, on the roller, or rollers, which is, or are, carried by the part of the suspension unit which is adapted for pivotal connection to the insulator.

The invention still further consists in a suspension unit as set forth in any of the three preceding paragraphs wherein one part of the unit is provided with a pivot pin and the other with an open slot in which the pivot pin engages, and wherein the two parts are locked in their assembled position by means of a shear pin, the fracture of the shear pin enabling the member carrying the clamping means to rock about the pivot pin preparatory to such part becoming disengaged from the part adapted for suspension from an insulator.

Preferred embodiments of the invention will now be described with reference to the annexed drawings wherein:

Figure 1 is an elevation of one construction of suspension unit in accordance with the invention, the upper part thereof being shown in section;

Figure 2 is an end view thereof shown partly in section;

Figure 3 is a sectional plan view on the line 3—3 of Figure 1;

Figure 4 shows an insulator, a suspension unit secured thereto and a cable supported by the suspension unit, the cable at one side of the unit being broken;

Figure 5 is an elevation, partly in section, of a modified construction of suspension unit in accordance with the invention;

Figure 6 is an end view thereof partly in section; and

Figure 7 is a plan view of Figure 1 with the upper part of the unit removed.

In the construction shown in Figures 1 to 3 the improved suspension unit is formed of two parts 10 and 11. Part 10 constitutes a conductor clamping device. Said device comprises a body part 12a which supports a cradle 12 to receive a cable, a tongue 13 to extend along the upper face of the cable and bolt and nut tightening means 13a by which the cable 12b can be securely clamped between the cradle 12 and tongue 13.

The body part is further provided with a pair of opposed lugs 14 which receive therebetween the opposed lugs 15a formed on the lower end 15a of a clamp suspender 15, an assembly pin 16 passing through the lugs 14 and 15a. To prevent rotation of the body part 12a about the pin 16 the lugs 15a and the lugs 14 are formed with interfitting projections 17 and recesses 18.

Towards its upper end the clamp suspender 15 carries two rollers 19 mounted one at each side thereof on a transverse pin 20.

Pivotally secured to the foot of the insulator 21 is the part 11 which is in the form of a housing 26 provided with a pair of opposed curved tracks 22 on which rest the aforesaid rollers 19. The side ends of the housing are open for the purpose hereafter set forth. The roof of the housing is provided with a transverse pivot pin 23 which fits within a slot 24 on the upper end of the clamp suspender. The radii of the tracks 22 are struck from the centre of the pin 23. The housing is pivotally attached to the insulator by means of a pivot pin 21a passing through lugs 21b on the upper end of the housing and through a hole in the lower end of the insulator.

The foot of the housing is further provided with a downwardly extending pair of lugs 24a which embrace the clamp above the lugs 15a, a shear pin 25 passing through said lugs 24a and clamp suspender 15.

Normally the weight of the cable is transmitted through the rollers 19, tracks 22 and housing to the insulator 21, the rollers resting centrally on the tracks.

In the event of a cable 12b at one side of the clamping device breaking, as shown in Figure 4, the cable on the other side thereof is no longer balanced and will impart a sudden pull to one side on the clamping device. This will tend to turn the clamp suspender about the axis of pin 23, with the result that the shear pin 25 is sheared, the rollers 19 then riding along the tracks 22 to the lower end thereof until they clear the tracks and pass through the end of the housing. The clamp suspender complete with clamp and cable attached thereto will then fall to the ground. In consequence the insulator is not damaged and no severe stresses are set up in the tower by reason of the breaking of the conductor.

In the suspension unit shown in Figures 5, 6 and 7, wherein the reference numerals denote the same or corresponding parts to those shown in Figures 1, 2 and 3, the rollers 19 are mounted on a transverse pin 20 passing through the member 11 which is secured to the insulator. The tracks 22 are formed on the underside of the roof of the housing 26 and bear on the rollers. The housing is now embodied in the part 10 which carries the transverse pivot pin 23. The latter fits within a slot 24 formed at the foot of the part 11.

The weight of the cable is transmitted through the tracks to the rollers and through the rollers to the insulator.

In this construction, in the event of a cable breaking the shear pin 25 is sheared, the part 10 pivots about the axis of pin 23 and the tracks run over the rollers until they clear the rollers whereon the cable with the part 10 of the suspension unit to which it is clamped falls to the ground.

What we claim is:

1. A suspension unit for suspending overhead high tension cables from the insulators of transmission towers said unit consisting of an upper part adapted for pivotal connection to an insulator and a lower part having clamping means by which a cable can be secured thereto, one of said parts having at least one roller and the other part having a track on which the roller bears whereby the lower part is supported by the upper part when said parts are in their assembled positions and shear pin extending through both parts whereby the two parts are retained normally in their assembled positions, said shear pin being such that it shears when the unit pivots about its pivotal support to a predetermined extent, as will occur when the cable on one side of the clamping device breaks, and thus permits the lower part together with the clamping means to move relative to the upper part so that the roller clears its track whereon the lower part together with the clamping means and cable clamped therein is permitted to drop.

2. A suspension unit as claimed in claim 1 wherein that part thereof to which the cable is clamped is provided with the roller and the other part is provided with the track therefor, the construction being such that when the pin is sheared and the upper part moves to such extent that the track clears, the roller, the part with the clamping means is permitted to fall.

3. A suspension unit as claimed in claim 1 wherein that part of the suspension unit to which the cable is secured is provided with the track, which bears on the roller, which is carried by the part of the suspension unit which is adapted for pivotal connection to the insulator.

4. A suspension unit as claimed in claim 1 wherein one part of the unit is provided with a pivot pin and the other with an open slot in which the pivot pin engages, and wherein the two parts are locked in their assembled position by means of the shear pin, the fracture of the shear pin enabling the member carrying the clamping means to rock about the pivot pin preparatory to such part becoming disengaged from the part adapted for suspension from an insulator.

References Cited in the file of this patent
UNITED STATES PATENTS 1,949,562    Deisch _____ Mar. 6, 1934